(12) United States Patent
Baek et al.

(10) Patent No.: US 9,326,040 B2
(45) Date of Patent: *Apr. 26, 2016

(54) DATA APPLICATION PROVIDING SERVER, BROADCASTING SERVER AND RECEIVER FOR DYNAMICALLY PROCESSING DATA APPLICATION AND DIGITAL BROADCASTING SYSTEM INCLUDING THE SAME

(75) Inventors: Wonjang Baek, Seongnam-si (KR); John Kim, Seoul (KR); Seong Baek Lee, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 1733 days.

This patent is subject to a terminal disclaimer.

(21) Appl. No.: 12/449,565

(22) PCT Filed: Feb. 14, 2008

(86) PCT No.: PCT/KR2008/000881
§ 371 (c)(1),
(2), (4) Date: Aug. 13, 2009

(87) PCT Pub. No.: WO2008/100096
PCT Pub. Date: Aug. 21, 2008

(65) Prior Publication Data
US 2010/0100920 A1 Apr. 22, 2010

(30) Foreign Application Priority Data
Feb. 14, 2007 (KR) .................... 10-2007-0015394

(51) Int. Cl.
| | | |
|---|---|---|
| *H04N 7/173* | (2011.01) |
| *H04N 21/61* | (2011.01) |
| *H04H 20/24* | (2008.01) |
| *H04H 20/30* | (2008.01) |
| *H04H 60/73* | (2008.01) |
| *H04N 21/235* | (2011.01) |
| *H04N 21/81* | (2011.01) |
| *H04L 29/08* | (2006.01) |
| *G06F 9/445* | (2006.01) |

(52) U.S. Cl.
CPC ........ *H04N 21/6175* (2013.01); *G06F 9/44521* (2013.01); *H04H 20/24* (2013.01); *H04H 20/30* (2013.01); *H04H 60/73* (2013.01); *H04L 67/02* (2013.01); *H04L 67/06* (2013.01); *H04N 7/17318* (2013.01); *H04N 21/2353* (2013.01); *H04N 21/8166* (2013.01); *G06F 9/445* (2013.01)

(58) Field of Classification Search
None
See application file for complete search history.

(56) References Cited

U.S. PATENT DOCUMENTS

| 6,725,461 B1 * | 4/2004 | Dougherty et al. ............. 725/40 |
| 2002/0116505 A1 * | 8/2002 | Higgins et al. ................ 709/227 |

(Continued)

FOREIGN PATENT DOCUMENTS

KR 10-2004-0067505 * 7/2004 ............. H04N 7/173

*Primary Examiner* — Joshua Taylor
(74) *Attorney, Agent, or Firm* — Stein IP, LLC

(57) ABSTRACT

A data application providing server, a broadcasting server and a receiver for dynamically processing a data application and a digital broadcasting system including the same are disclosed wherein a data of a minimum quantity required for executing a data application is received and other data is received by a pull method to minimize a time required for receiving and executing the data application, and wherein a change in the data application is facilitated, and a stability of the execution of the data application is maintained and an execution speed is improved through a tread management or a task management.

16 Claims, 2 Drawing Sheets

(56) References Cited

U.S. PATENT DOCUMENTS

2004/0255336 A1* 12/2004 Logan et al. ................ 725/135
2007/0192818 A1* 8/2007 Bourges-Sevenier et al. ............................ 725/132

* cited by examiner

<Prior Art>

Fig. 3

| DATA AGENT | LOGGING | CONTENT SERVICE | OTHER SERVICES |
|---|---|---|---|
| METHOD PROTOCOL | | FAST FILE SYSTEM | |
| NETWORK MANAGER | | | |
| TASK MANAGER | | | |
| J2EE | | | |

DATA APPLICATION PROVIDING SERVER, BROADCASTING SERVER AND RECEIVER FOR DYNAMICALLY PROCESSING DATA APPLICATION AND DIGITAL BROADCASTING SYSTEM INCLUDING THE SAME

This is a National Phase Application filed under 35 USC 371 of International Application No. PCT/KR2008/000881, filed on Feb. 14, 2008, which claims foreign priority benefit under 35 USC 119 of Korean Application No. 10-2007-0015394, filed on Feb. 14, 2007, the entire content of each of which is hereby incorporated herein by reference in its entirety.

TECHNICAL FIELD

The present invention relates to a data application providing server, a broadcasting server and a receiver for dynamically processing a data application and a digital broadcasting system including the same, and more particularly to a data application providing server, a broadcasting server and a receiver for dynamically processing a data application and a digital broadcasting system including the same wherein a data of a minimum quantity required for executing a data application is received and other data is received by a pull method to minimize a time required for receiving and executing the data application, and wherein a change in the data application is facilitated, and a stability of the execution of the data application is maintained and an execution speed is improved through a thread management or a task management.

BACKGROUND ART

An environment of a broadcasting is changing as a technology progresses and a demand of a viewer changes. Recently, an analog broadcasting is switched to a digital broadcasting, and a broadcast medium is diversified from a terrestrial broadcasting to a cable broadcasting, a satellite broadcasting, an IP-TV service using a high speed communication network, a terrestrial DMB and a satellite DMB.

The digital broadcasting is capable of providing additional services in various filed such as sports, movies, home shoppings and musics because a capacity thereof is four to eight times that of the analog broadcasting. A wide variety of choices for the viewer is also provided since various types of the broadcasting such as the cable broadcasting, the satellite broadcasting, a DMB (Digital Multimedia Broadcasting) and the IP-TV service.

Specifically, a single broadcasting channel has a bandwidth of 6, 7 or 8 MHz. In the analog broadcasting a broadcast program signal, i.e. an analog video signal and an audio signal is transmitted via a carrier signal having the bandwidth of 6, 7 or 8 MHz. therefore, only one broadcast program signal is transmitted via the single broadcasting channel.

However, in the digital broadcasting, the analog video signal and the audio signal are converted to a digital video data and a digital audio data, and the digital video data and the digital audio data are compressed according to an MPEG technology to be transmitted as the broadcast program signal. Therefore, a plurality of broadcast program signals may be multiplexed in the single broadcasting channel to form a plurality of virtual broadcasting channels.

Accordingly, the digital broadcasting is capable of a multi-channel broadcasting by transmitting the plurality of broadcast program signals wherein the digital video data and the digital audio data are multiplexed into the single broadcasting channel contrary to the analog broadcasting wherein only one broadcast program signal is transmitted via the single broadcasting channel.

The digital broadcasting supports multiple resolutions including a HDTV (High Definition Television) supporting an aspect ratio of 16:9 and a high resolution of 1920×1080 or 1280×720, and a SDTV (Standard Definition Television) supporting an aspect ratio of 16:9 or 4:3 and a resolution of 740×480 or 640×480.

Due to the high resolution of the HDTV, a size of the digital video data is large. As a result, only one broadcast program signal may be transmitted per broadcasting channel. In case of the SDTV, four or five broadcast program signals may be transmitted per broadcasting channel since the size of the digital video data is small, thereby allowing the multi-channel broadcasting.

That is, while only one broadcasting is possible per broadcasting channel in the conventional analog broadcasting, multiple broadcastings are transmitted per broadcasting channel for the multi-channel broadcasting by the compression and the multiplexing of the digital data and the viewer selects the broadcasting from the multiple broadcastings.

Addition to the transmission of the conventional broadcast program signal, various data may be broadcasted and an interactivity may be embodied by associating with the communication network in the digital broadcasting environment. The data broadcasting, various data services using the interactivity in particular, is expected to play a major role in propagating the digital broadcasting in view of an easy use by the viewer.

The terrestrial digital broadcasting was initiated in October, 2001 and the satellite digital broadcasting was initiated in March, 2002 in Korea. The cable digital broadcasting and the IP-TV service are also spreading among cable broadcasters and internet service providers. The terrestrial data broadcasting and the satellite data broadcasting were initiated in June, 2002 in Korea. The digital broadcasting for a mobile reception such as a satellite DMB and a terrestrial DMB is also spreading.

FIG. 1 is a block diagram exemplifying a conventional data broadcast system in a digital broadcast.

As shown, the conventional data broadcast system comprises a broadcasting server 110, a content provider server 120, a data provider server 130 and a receiver 140.

The content provider server 120 provides a broadcast content, i.e. the conventional broadcast program to the broadcasting server 110.

The data provider server 130 provides a content for a data broadcasting, i.e. a data content to the broadcasting server 110.

The broadcasting server 110 receives the broadcast content and the data content from the content provider server 120 and the data provider server 130, respectively, multiplexes and converts the same into various broadcasting specification such as ATSC to be transmitted to the receiver 140 through a broadcast network. The broadcast network includes various networks such as a terrestrial broadcast network, a cable broadcast network, a satellite broadcast network, a high speed communication network of the IP-TV service and a DMB network.

In addition, the broadcasting server 110 may receive a feedback signal transmitted from the receiver 140 through a return channel and transmits the feedback signal to the content provider server 120 or the data provider server 130 for the content provider server 120 or the data provider server 130 to carry out a corresponding process. The receiver 140 may also transmit the feedback signal to the content provider server 120 or the data provider server 130 through the return channel. Preferably, the return channel is embodied by a bidirectional communication network.

The return channel refers to a mean for transmitting a feedback of a viewer to the broadcasting server 110, the content provider server 120 or the data provider server 130 and is not limited in a communication method or a communication format.

The receiver 140 receives the broadcast content and the data content from the broadcasting server 110 and provides the contents to the viewer via a signal processing such as an appropriate decoding. For instance, the receiver 140 may be a digital TV or a set-top box in compliance with the terrestrial broadcasting specification such as the ATSC and interactive data broadcasting specification such as DASE in case of the terrestrial digital broadcasting. The receiver 140 may be a set-top box supporting the broadcasting specification such as OpenCable and DVB and a data broadcasting specification suitable for the broadcasting network such as OCAP and MHP in case of the cable broadcasting or the satellite broadcasting. The receiver 140 may be a set-top box or a mobile communication terminal supporting a corresponding data broadcasting specification in case of the IP-TV or the DMB.

The data content is generally transmitted in a carousel format such as a DSM-CC data/object carousel. Since a processing capacity or a storage capacity of the receiver 140 is limited, it is virtually impossible for the receiver 140 to store and execute an entirety of the data content therein. Therefore, the receiver 140 receives the data content transmitted periodically through the broadcasting network and provides the data content as the data broadcasting.

The data application may be configured to display a text data based on a font and may include a control element such as a widget and an image. For instance, the data application may include a button or an icon for selecting a desired data.

The data application is transmitted within a digital broadcast signal. The receiver 140 receives and processes the data application. The receiver 140 transmits the processed data application to a display apparatus (not shown). The display apparatus displays the received data application.

In embodying the data broadcasting, a method wherein the data application itself is transmitted within the digital broadcast signal, and a resource required for executing the data application is transmitted through the return channel may be employed. That is, the resource such as an image data may be received by a communication with an apparatus for storing the resource such as the data provider server 130.

Currently, in the IP-TV service for instance, the data application is transmitted via an IP multicast method. Therefore, an excessive time is required for the data application to load after the viewer selects a data broadcasting channel.

The broadcasting server 110 transmits the data application by dividing the data application into packets similar to a transmission of a broadcasting packet. The receiver 140 receives the packets and combines the packets into the data application. Particularly, a transmission speed of the data application in the IP multicast method is lower than that of a unicast method. In addition, the packets may be lost during the transmission so that the data application cannot be executed.

A video data of a digital broadcast program may be reproduced even when a portion of packets is lost by ignoring the lost packets and using other packets. However, the data application cannot be executed when a portion of the packets thereof is lost. Therefore, the receiver 140 should re-receive an entirety of the data application when an error occurs.

In addition, even after the receiver 140 receives the packets of the data application, the receiver should combine the received packets according to an order thereof. Therefore, a time for combining the packets is additionally required when the data application is executed.

Moreover, even after the packets are combined, the receiver 140 cannot load the data application in a divided fashion but load and execute the entirety of the data application. Therefore, an execution speed is degraded and the resource of the receiver 140 is excessively used.

Further more, even when the receiver 140 receives the resource separately from the data application through the return channel, the receiver 140 should receive the resource via a HTTP communication. Therefore, the receiving speed is degraded.

Due to the above-described drawbacks, 10 to 30 seconds of time is consumed for the receiver 140 to receive and provide the data application to the viewer. Therefore, the conventional method is disadvantageous in that an excessive time is required for the reception and the execution of the data application.

DISCLOSURE OF INVENTION

Technical Problem

It is an object of the present invention to provide a data application providing server, a broadcasting server and a receiver for dynamically processing a data application and a digital broadcasting system including the same wherein a data of minimum quantity required for executing a data application is received and other data is received by a pull method to minimize a time required for receiving and executing the data application, and wherein a change in the data application is facilitated, and a stability of the execution of the data application is maintained and an execution speed is improved through a thread management or a task management.

Technical Solution

In order to achieve above-described object of the present invention, there is provided a digital broadcasting system for dynamically processing a data application, the system comprising: a data application providing server for dynamically dividing and providing a minimum execution data and an additional data included in the data application; a broadcasting server for relaying the minimum execution data received from the data application providing server and carrying out a digital broadcast; and a receiver for transmitting a transmission request for the additional data to the data application providing server, the additional data being generated based on the minimum, execution data relayed by the broadcasting server, and for providing the data application including the additional data provided by the data application providing server according to the minimum execution data relayed by the broadcasting server and the transmission request.

There is also provided a broadcasting server for dynamically processing a data application, the server comprising: a minimum execution data storage for storing a minimum execution data received from a data application providing server, the data application providing server dynamically dividing and providing the minimum execution data and an additional data included in the data application; a minimum execution data transmitter for transmitting the minimum execution data stored in the minimum execution data storage through a digital broadcast network to a receiver providing the data application.

Preferably, the minimum execution data includes a download location of the data application providing server for obtaining the additional data.

There is also provided a data application providing server for dynamically processing a data application, the server comprising: a data application divider for dividing the data application into a minimum execution data and an additional data; a minimum execution data transmitter for transmitting the minimum execution data to a broadcasting server for carrying out a digital broadcast such that the broadcasting server broadcasts the minimum execution data; an additional data storage for storing the additional data corresponding to the minimum execution data; and a receiver communication interface for transmitting the additional data to the receiver according to a transmission request of the additional data received from the receiver providing the data application.

Preferably, the receiver communication interface transmits the additional data via a communication based on an asynchronous socket.

Preferably, the data application providing server further comprises a task manager for managing a thread of the data application providing server and scheduling a task.

Preferably, the data application divider dynamically divides the minimum execution data and the additional data to correspond to a change in the data application, and the additional data storage stores the dynamically divided additional data.

Preferably, the additional data storage stores the additional data based on a memory.

There is also provided a receiver for dynamically processing a data application, the receiver comprising: a minimum execution data receiver for receiving a minimum execution data through a digital broadcast network from the broadcasting server carrying out a digital broadcast; a minimum execution data analyzer for analyzing the minimum execution data to extract an execution condition information of the data application and an information on an additional data corresponding to the minimum execution data required for executing the data application; a data application providing server interface for transmitting a transmission request for the additional data to a data application providing server during an execution of the minimum execution data, and for receiving the additional data from the data application providing server; and a data application provider for combining the minimum execution data and the additional data to generate the data application, and executing and providing the generated the data application.

Preferably, the data application providing server interface receives the additional data from the data application providing server via a communication based on an asynchronous socket.

Preferably, the receiver further comprises a task manager for managing a thread of the data application providing server and scheduling a task.

Preferably, the minimum execution data includes a download location of the data application providing server for obtaining the additional data.

Preferably, the minimum execution data comprises one of a metadata for the data application and a foundation class data for minimally executing the data application.

Advantageous Effects

In accordance with the present invention, a data of a minimum quantity required for executing a data application is received and other data is received by a pull method to minimize a time required for receiving and executing the data application, the change in the data application is facilitated, and the stability of the execution of the data application is maintained and the execution speed is improved through the thread management or the task management.

BRIEF DESCRIPTION OF THE DRAWINGS

FIG. 3 is a diagram illustrating a hierarchical structure of a data application providing server of a digital broadcasting system for dynamically processing a data application in accordance with the present invention.

DESCRIPTION OF THE REFERENCE NUMERALS

Figure 1:
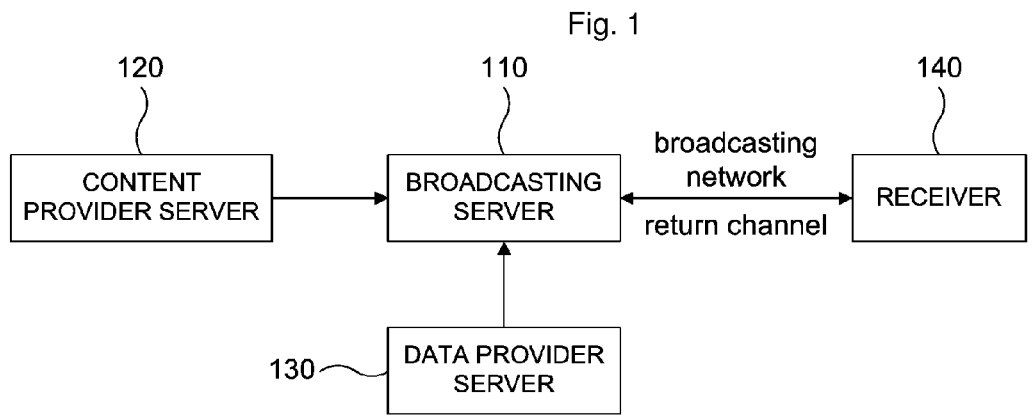
FIG. 1 is a block diagram exemplifying a conventional data broadcast system of a digital broadcast.

110: broadcasting server 120: content provider server
130: data provider server 140: receiver
200: broadcasting server
210: minimum execution data storage
220: minimum execution data transmitter
300: data application providing server
310: data application divider
330: minimum execution data transmitter
350: additional data storage
370: receiver communication interface 400: receiver
410: minimum execution data receiver
430: minimum execution data analyzer
450: data application providing server interface
470: data application provider

BEST MODE FOR CARRYING OUT THE INVENTION

The present invention will now be described in detail with reference to the accompanied drawings.

Figure 2:
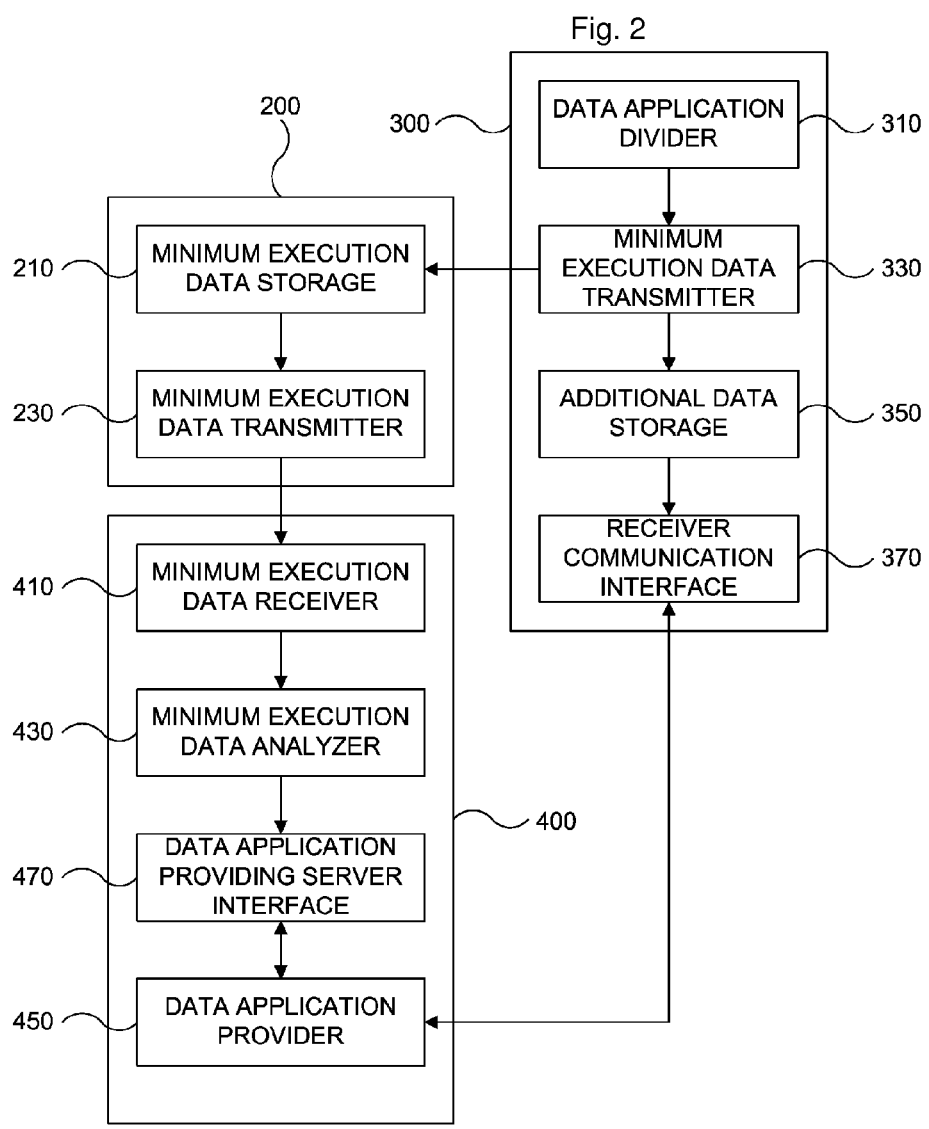
FIG. 2 is a block diagram illustrating a digital broadcasting system for dynamically processing a data application in accordance with the present invention.

FIG. 2 is a block diagram illustrating a digital broadcasting system for dynamically processing a data application in accordance with the present invention.

Referring to FIG. 2, the digital broadcasting system for dynamically processing the data application in accordance with the present invention comprises a broadcasting server 200, a data application providing server 300 and a receiver 400.

The broadcasting server 200 carries out a digital broadcast. The broadcasting server 200 carries out the digital broadcast using a terrestrial broadcasting network, a cable broadcasting network, a satellite broadcasting network, a communication network similar to an IP-TV or a DMB network.

The broadcasting server 200 in accordance with the present invention receives only a minimum execution data from the data application providing server 300 and relays the minimum execution data to the receiver 400 while carrying out the digital broadcast.

While the conventional broadcasting server transmits an entirety of the data application through the digital broadcast network, the broadcasting server 200 in accordance with the present invention transmits only the minimum execution data.

The data application providing server 300 provides the data application.

The data application providing server 300 dynamically divides the data application into the minimum execution data and an additional data, and transmits the minimum execution data to the broadcasting server 200. The data application providing server 300 receives a transmission request for the additional data transmitted from the receiver 400 corresponding to the minimum execution data that is broadcast by the broadcasting server 200, and transmits the additional data to the receiver 400 to correspond to the transmission request.

The receiver 400 receives and provides the digital broadcast that is broadcast from the broadcasting server 200 and the data application provided by the data application providing server 300.

Specifically, the receiver 400 receives the minimum execution data transmitted from the broadcaster server 200, and analyzes the received minimum execution data to request the additional data to the data application providing server 300. The receiver 400 also receives the additional data form the data application providing server 300 to provide the data application.

In accordance with the digital broadcasting system of the present invention, the data application includes the minimum execution data and the additional data.

The minimum execution data refers to a metadata for the data application or a foundation class data for a minimum execution of the data application.

In addition, the additional data is a data included in the data application exclusive of the minimum execution data. Particularly, the additional data refers to an additional class data or a resource data such as a text or an image required for executing the data application.

After the data application providing server 300 divides the data application into the minimum execution data and the additional data, the minimum execution data is transmitted to the broadcasting server 200. the broadcasting server 200 transmits only the minimum execution data to the receiver 400.

Thus, in accordance with the present invention, since the data transmitted through the digital broadcast network is the minimum execution data having a small size, a possibility of an error during the transmission may be minimized. Moreover, since the receiver 400 receives only the minimum execution data through the digital broadcast network, a time required for receiving the data application may be minimized. Since the additional data having a large size is transmitted through the return channel having a higher speed than the digital broadcast network, the possibility of the error during the transmission may be minimized, and the time required for the receiver 400 to receive the data application may be minimized.

A detailed description of configurations of the broadcasting server 200, the data application providing server 300 and the receiver 400 is as follows.

Referring to FIG. 2, the broadcasting server 200 includes a minimum execution data storage 210 and a minimum execution data transmitter 220.

The minimum execution data storage 210 receives the minimum execution data from the data application providing server 300 and stores the received minimum execution data.

The minimum execution data transmitter 230 transmits the minimum execution data stored in the minimum execution data storage 210 to the receiver 400 through the digital broadcast network.

The conventional broadcasting server 110 shown in FIG. 1 transmits the data application having the large size resulting in a high possibility of a transmission error and a long transmission time. However, the broadcasting server 200 in accordance with the present invention overcomes the problem of the conventional broadcasting server 110 by transmitting only the minimum execution data.

Still referring to FIG. 2, the data application providing server 300 comprises a data application divider 310, a minimum execution data transmitter 330, an additional data storage 350 and a receiver communication interface 370.

The data application divider 310 divides the data application into the minimum execution data and the additional data.

The division is carried out for an efficient execution of the data application. For instance, the division may be carried out by extracting the metadata for the data application or the foundation class data for the minimum execution of the data application as the minimum execution data and designating the additional class data required for the execution of the data application or the resource data such as the text or the image as the additional data.

In addition, the division may be carried out dynamically. That is, when a change in the data application occurs frequently, the minimum execution data may be maintained and the additional data, a resource for instance, may be changed.

When the change in the data application occurs frequently, the changed data application should be re-transmitted in accordance with the conventional art. However, in accordance with the present invention, the broadcasting server 200 may transmit an unchanged minimum execution data and the data application providing server 300 may transmit the changed additional data. Therefore, a service expandability, a change facilitation and a management facilitation may be improved in providing the data application.

The minimum execution data transmitter 330 transmits the minimum execution data divided by the data application divider 310 to the broadcasting server 200 such that the broadcasting server 200 may broadcast the minimum execution data.

The additional data storage 350 stores the additional data corresponding to the minimum execution data divided by the data application divider 310.

Preferably, the additional data storage 350 stores the additional data based on a memory. When the additional data is stored based on the memory, the additional data storage 350 may search the stored additional data and provide the searched additional data to the receiver 400 efficiently. Therefore, even when a plurality of the additional data is simultaneously requested from a plurality of the receivers 400, the additional data storage 350 may search the additional data corresponding to each of the requests from the plurality of the receivers 400 and provide the searched additional data to the plurality of the receivers 400, thereby minimizing a system load of the data application providing server 300.

The receiver communication interface 370 receives a transmission request of the additional data from the receiver 400 and transmits the additional data to the receiver 400.

It is preferable that the receiver communication interface 370 transmits the additional data via a communication based on an asynchronous socket.

While the additional data may be received by a conventional HTTP request, it is disadvantageous that a transmission speed thereof is slow.

Therefore, the receiver communication interface 370 may improve the transmission speed of the additional data by carrying out the communication based on the asynchronous socket with the receiver 400.

Although not shown, the data application providing server 300 may further comprise a task manager (not shown) for managing a thread of the data application providing server 300 and scheduling a task.

Particularly, when a plurality of the threads or the tasks such as the thread or the task corresponding to the request for the plurality of the additional data from the receiver 400, or the thread or the task for extracting the minimum execution data or the additional data are carried out in the data application providing server 300, the task manager controls a system resource of the data application providing server 300 by managing the threads and carrying out a scheduling of the tasks of the data application providing server 300. Accordingly, a use of the system resource of the data application providing server 300 is maximized.

The task manager adjusts an amount of a processed task by controlling a cue size, distributes a task resource efficiently or processes the task based on a priority.

The data application providing server 300 provides the data application efficiently by a service oriented architecture.

Referring to FIG. 2 again, the receiver 400 comprises a minimum execution data receiver 410, a minimum execution data analyzer 430, a data application providing server interface 450 and a data application provider 470.

The minimum execution data receiver 410 receives the minimum execution data through the digital broadcast network from the broadcasting server 200 that carries out the digital broadcast.

The minimum execution data analyzer 430 analyzing the minimum execution data received by the minimum execution data receiver 410 to extract an execution condition information of the data application and an information on the additional data corresponding to the minimum execution data.

The data application providing server interface 450 transmits the transmission request for the additional data to the data application providing server 300 during the execution of the minimum execution data, and receives the additional data from the data application providing server 300.

It is preferable that the data application providing server interface 450 receives the additional data by carrying out the communication based on the asynchronous socket with the data application providing server 300.

Accordingly, the receiving speed is improved.

The additional data may be received by the conventional HTTP request. However, the conventional HTTP request is disadvantageous in that the transmission speed is low.

Therefore, the data application providing server interface 450 carries out the communication based on the asynchronous socket with the data application providing server 300 to improve the receiving speed.

The data application provider 470 executes and provides the data application obtained by combining the minimum execution data and the additional data received from the data application providing server interface 450.

Although not shown, the receiver 400 may further comprise a task manager (not shown) for managing a thread for executing the data application and scheduling a task.

Particularly, when a plurality of the threads or the tasks such as the thread or the task for executing the data application, or the thread or the task for executing and decoding the digital broadcast are carried out in the receiver 400, the task manager manages the threads and carries out a scheduling of the tasks. Accordingly, a use of the system resource of the receiver 400 is maximized.

The task manager adjusts an amount of a processed task by controlling a cue size, distributes a task resource efficiently or processes the task based on a priority.

Specifically, the task manager manages an entirety of the threads, the tasks and a resource such as a memory. Accordingly, a performance of the receiver 400 in a network communication and a provision of GUI in the receiver 400 is maximized.

MODE FOR THE INVENTION

FIG. 3 is a diagram illustrating a hierarchical structure of the data application providing server of the digital broadcasting system for dynamically processing the data application in accordance with the present invention.

FIG. 3 is focused on the data application providing server, and the receiver is described in view of a difference between the hierarchical structure of the data application providing server and that of the receiver.

A J2EE at the bottom is a hierarchy for providing an association with a conventional system or providing an expandability of the data application. The J2EE is the hierarchy in the data application providing server. A Java 1.1 hierarchy or a JavaTV hierarchy may exist in the receiver.

Since the data application is mostly created based on a Java, a common data application creation and execution environment is configured via the J2EE, the Java 1.1 or the JavaTV.

A task manager hierarchy carries out a thread management and a scheduling of the tasks.

The task manager hierarchy corresponds to the task manager of the data application providing server or the task manager of the receiver described with reference to FIG. 2.

A network manager hierarchy supports the communication based on the asynchronous socket. The transmission speed is maximized by the asynchronous socket.

The network manager hierarchy may be associated with the management of the thread of the task manager to enable a re-use of a network resource and an improvement of a performance.

A method protocol may be embodied in the data application providing server or the receiver similarly, and a communication scheme thereof may be configured to minimize a network load.

A fast file system is for accessing the resource based on the memory and is embodied in the data application providing server. A smart cache system is embodied in the receiver to correspond to the fast file system.

The fast file system carries out an synchronization of the resource stored in the memory such as the additional data and the resource stored in a disk using a transaction. In addition, the fast file system may be configured to be distributed or synchronized in multiple systems.

The smart cache system is configured to obtain, execute and provide various resources such as the class, the image and the text dynamically in the receiver.

A data agent, a logging, a content service and other services are an application hierarchy corresponding to various services of the data application of the digital broadcast.

A hierarchy such as a GUI may be included in the receiver to provide the data application.

While the present invention has been particularly shown and described with reference to the preferred embodiment thereof, it will be understood by those skilled in the art that various changes in form and details may be effected therein without departing from the spirit and scope of the invention as defined by the appended claims.

INDUSTRIAL APPLICABILITY

In accordance with the present invention, the data of the minimum quantity required for executing the data application is received and other data is received by the pull method to minimize the time required for receiving and executing the data application, and wherein the change in the data application is facilitated, and the stability of the execution of the data application is maintained and the execution speed is improved through the thread management or the task management.

The invention claimed is:

1. A digital broadcasting system for dynamically processing a data application, the system comprising:
a data application providing server for dynamically dividing the data application into minimum execution data and additional data, transmitting the minimum execution data to a broadcasting server, and transmitting the additional data to a receiver;
the broadcasting server for receiving the minimum execution data from the data application providing server and relaying the minimum execution data to the receiver and carrying out a digital broadcast; and
the receiver for receiving the minimum execution data from the broadcasting server, analyzing the minimum execution data, transmitting a transmission request for the additional data to the data application providing server, the transmission request being generated based on the analysis of the minimum execution data, and providing the data application including the additional data provided by the data application providing server according to the transmission request and the minimum execution data relayed by the broadcasting server.

2. The system in accordance with claim 1, wherein the minimum execution data includes a download location of the data application providing server for obtaining the additional data.

3. The system in accordance with claim 1, wherein the minimum execution data comprises one of a metadata for the data application and a foundation class data for minimally executing the data application.

4. A broadcasting server for dynamically processing a data application, the server comprising:
a minimum execution data storage for storing a minimum execution data received from a data application providing server, the data application providing server dynamically dividing the data application into the minimum execution data and an additional data and providing the minimum execution data and the additional data;
a minimum execution data transmitter for transmitting the minimum execution data stored in the minimum execution data storage through a digital broadcast network to a receiver for providing the data application.

5. The server in accordance with claim 4, wherein the minimum execution data includes a download location of the data application providing server for obtaining the additional data.

6. The server in accordance with claim 4, wherein the minimum execution data comprises one of a metadata for the data application and a foundation class data for minimally executing the data application.

7. A data application providing server for dynamically processing a data application, the server comprising:
a data application divider for dividing the data application into a minimum execution data and an additional data;
a minimum execution data transmitter for transmitting the minimum execution data to a broadcasting server for carrying out a digital broadcast such that the broadcasting server broadcasts the minimum execution data;
an additional data storage for storing the additional data corresponding to the minimum execution data; and
a receiver communication interface for transmitting the additional data to the receiver according to a transmission request of the additional data received from the receiver providing the data application.

8. The server in accordance with claim 7, wherein the receiver communication interface transmits the additional data via a communication based on an asynchronous socket.

9. The server in accordance with claim 7, further comprising a task manager for managing a thread of the data application providing server and scheduling a task.

10. The server in accordance with claim 7, wherein the data application divider dynamically divides the minimum execution data and the additional data to correspond to a change in the data application, and the additional data storage stores the dynamically divided additional data.

11. The server in accordance with claim 7, wherein the additional data storage stores the additional data based on a memory.

12. The server in accordance with claim 7, wherein the minimum execution data comprises one of a metadata for the data application and a foundation class data for minimally executing the data application.

13. A receiver for dynamically processing a data application, the receiver comprising:
a minimum execution data receiver for receiving minimum execution data, which have been transmitted from a data application providing server to a broadcasting server, through a digital broadcast network from the broadcasting server carrying out a digital broadcast;
a minimum execution data analyzer for analyzing the minimum execution data to extract an execution condition information of the data application and an information on an additional data corresponding to the minimum execution data required for executing the data application;
a data application providing server interface for transmitting a transmission request for the additional data to the data application providing server during an execution of the minimum execution data, and for receiving the additional data from the data application providing server; and
a data application provider for combining the minimum execution data and the additional data to generate the data application, and executing and providing the generated the data application.

14. The receiver in accordance with claim 13, wherein the data application providing server interface receives the additional data from the data application providing server via a communication based on an asynchronous socket.

15. The receiver in accordance with claim 13, further comprising a task manager for managing a thread of the data application providing server and scheduling a task.

16. The receiver in accordance with claim 13, wherein the minimum execution data comprises one of a metadata for the data application and a foundation class data for minimally executing the data application.

* * * * *